United States Patent [19]

Weihrich et al.

[11] 4,324,944

[45] Apr. 13, 1982

[54] ARRANGEMENT FOR CONTROLLING THE ELECTRODES OF AN ARC FURNACE

[75] Inventors: Georg Weihrich, Uttenreuth; Wilfried Grunert; Hans-Jörg Nüsslin, both of Erlangen, all of Fed. Rep. of Germany

[73] Assignee: Siemens Aktiengesellschaft, Munich, Fed. Rep. of Germany

[21] Appl. No.: 212,216

[22] Filed: Dec. 2, 1980

[30] Foreign Application Priority Data

Dec. 4, 1979 [DE] Fed. Rep. of Germany ....... 2948787

[51] Int. Cl.³ ............................................ H05B 7/148
[52] U.S. Cl. ...................................... 373/105; 373/106
[58] Field of Search ..................... 13/9, 12, 13; 314/74

[56] References Cited

U.S. PATENT DOCUMENTS

| | | | |
|---|---|---|---|
| 2,367,979 | 1/1945 | Valentine | 314/74 |
| 3,435,121 | 3/1969 | Jackson | 13/13 |
| 4,096,344 | 6/1978 | Munson | 13/13 |

FOREIGN PATENT DOCUMENTS

| | | |
|---|---|---|
| 1163996 | 2/1964 | Fed. Rep. of Germany . |
| 1183185 | 12/1964 | Fed. Rep. of Germany . |
| 2238006 | 8/1978 | Fed. Rep. of Germany . |

*Primary Examiner*—Roy Envall
*Attorney, Agent, or Firm*—Kenyon & Kenyon

[57] ABSTRACT

An impedance controller is used for controlling electrode-to-bath spacing in an arc furnace. Measured quantities proportional to the electrode voltage and the electrode current are determined and an actual impedance value is formed from the measured values by means of a divider. The actual impedance value is compared with a predeterminable desired impedance value to derive a control signal. If in the event of a short circuit, the actual impedance value reaches a predetermined lower limit, a switching element sets into the controller a signal causing full drive, so that the electrodes are raised at maximum velocity. If the sum of the two measurement quantities becomes zero, the output of the controller is cut off.

6 Claims, 1 Drawing Figure

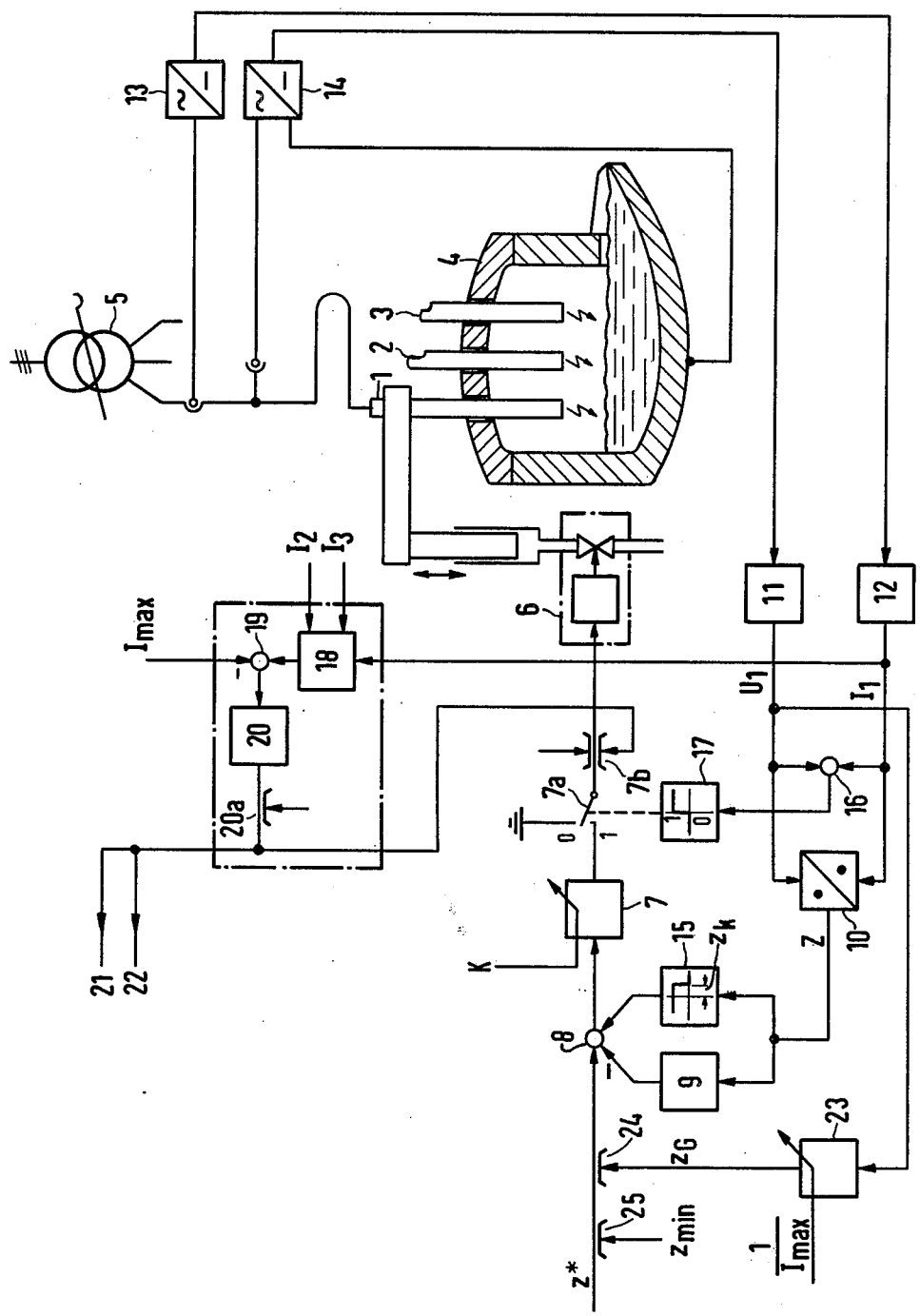

4,324,944

ARRANGEMENT FOR CONTROLLING THE ELECTRODES OF AN ARC FURNACE

BACKGROUND OF THE INVENTION

1. Field of the Invention

The invention relates to an arrangement for controlling the electrode height in an arc furnace fed from a transformer. In particular, the invention relates to an arrangement in which an impedance controller controls the height of the electrode or, in 3-phase arc furnaces, of each of the electrodes above the material being melted in response to an impedance signal obtained from one measuring element furnishing a quantity proportional to the electrode voltage measured between the secondary terminal of the transformer of the respective electrode and the furnace jacket, and another measuring element furnishing a quantity proportional to the electrode current of the same electrode.

2. The Prior Art

In known arrangements of this kind shown in German Auslegeschrift No. 1,183,185 and German Auslegeschrift No. 1,163,996, a control deviation for the impedance is obtained directly from the measured quantities proportional to the electrode voltage between the transformer terminal and the furnace jacket, and the electrode current.

It is known in addition, as shown in U.S. Pat. No. 2,367,979 and German Auslegeschrift No. 2,238,006, to vary the desired impedance value as a function of the supply voltage of the arc furnace by means of a function generator influencing the quantity proportional to the electrode voltage.

Strictly speaking, the known arrangement according to German Auslegeschrift No. 2,238,006, supra, operates in principle not with impedance control but with a linearized admittance control.

OBJECTS AND SUMMARY OF THE INVENTION

It is an object of the invention to obtain the electrode control by means of a nonlinear impedance control and to enter into the controller unequivocal action criteria for the short-circuit case and the placing of a leading electrode on the material to be melted during the start-up of the furnace.

According to the invention, this problem is solved by the provision that the control deviation is formed as the difference between a settable desired impedance value and the actual value obtained from the measurement quantities by means of a divider. The divider is followed by a lowpass filter and a first circuit component shunted across it for setting a signal that drives the controller in full in the short-circuit case. The sum of the measurement quantities is formed in a summing element, and another circuit element connected to the summing element shuts off the output of the impedance controller at the instant the sum reaches zero.

The invention will be described in greater detail in connection with the drawing in which the only FIGURE is a schematic circuit block illustrating one embodiment.

DETAILED DESCRIPTION OF THE INVENTION

The electrodes 1, 2, 3 of a 3-phase arc furnace 4 are connected, via a stepwise variable transformer 5, to a 3-phase network that supplies sufficient electrical energy to generate melting heat in the material contained in the furnace. Each electrode of the arc furnace is equipped with a control arrangement to control its positioning, and since the control arrangements are identical, only the control arrangement for electrode 1 is shown in detail in the drawing.

Mechanical positioning of the electrode 1 is accomplished by means of a positioning system 6, which may be an electrohydraulic positioning system, for example, to control the spacing between the electrode 1 and the material to be melted. This distance corresponds approximately to the length of the arc and can be adjusted by changing the height of the electrode support arm. The positioning system 6 is connected to the output of a proportional-action impedance controller 7, the gain K of which can preferably be varied as a function of the step position of the furnace transformer 5.

A first measuring element 13 consisting of a current transformer and a rectifier furnishes a signal $I_1$ proportional to the current flowing through the electrode, and another measuring element 14, which consists of a voltage transformer and a rectifier, furnishes a signal $U_1$ proportional to the furnace voltage between the corresponding secondary terminal of the furnace transformer and the neutral point formed by the furnace shell. The measurement quantities proportional to the electrode current and the electrode voltage are fed through lowpass filters 11 and 12, respectively, to a divider 10 that furnishes the actual impedance value 1. The output of the divider is connected via a first-order lowpass filter 9, the time constant of which is relatively large, to a comparison point 8, in which the control deviation of the input variable for the impedance controller 7 is formed from a settable desired impedance value $Z^*$ and an actual value z.

The actual impedance value Z is also present at a switching element 15, which has an on-off characteristic and is shunted across the lowpass filter 9. If a short circuit of the electrode 1 to the bath is imminent, the switching element delivers a signal voltage that causes the impedance controller 7 to be driven fully in one direction. This happens as soon as the actual impedance value Z reaches a predetermined value $z_k$, which is slightly above the value of the short-circuit impedance, so that the respective electrode 1 is raised at maximum velocity.

The sum of the two measurement variables $I_1$ and $U_1$ that have been smoothed in the lowpass filters 11 and 12 is formed continuously in a summing stage 16. The output of the impedance controller 7 is shut off by an on-off switch 17 connected to the summing stage if the sum has the value zero, and the output remains at zero potential, as indicated in the drawing by the double-throw switch 7a. As a result the electrode 1, 2, or 3 that was moving downward during the start-up of the furnace is stopped at the instant when it is the first one to reach material to be melted. At this moment, the sum of the measurement variables $I_1$ and $U_1$ is zero because the voltage breaks down and no current flows yet as long as only one electrode has settled.

An overcurrent control, which includes a selection element 18, a comparison point 19, and an overcurrent controller 20, engages the impedance controller 7 by way of substitution and reduces the wear on the furnace breaker, the thermal and dynamic stress of the electrodes and the influence of network reaction. The selection element 18 determines which of the currents $I_1, I_2$ or $I_3$ of the 3-phase current is the largest. The purpose of the selection element is to determine overcurrents which occur particularly in the melting-down operation due to increases of the network voltage or to short circuits in the adjacent phases. The highest value current is compared at the comparison point 19 with the permissible current $I_{max}$ and the difference is fed to the overcurrent controller 20 with proportional-integral action. If the selected maximum current value exceeds the permissible value, the positive difference drives the output of the controller to its positive limit and thereby leads the variable limit device 7b, which is customarily part of the impedance controller 7, to its upper limit value. As a result, the positioning signal fed to the positioning element 6 assumes its adjustable maximum value. If the selected maximum current does not reach the permissible current, then all output signals of the impedance controller larger than the lower limit of the limiter 7b, which is set to the minimum positioning signal, address the positioning element 6. The integration constant of the overcurrent controller 20 is chosen small so that the overcurrent control will respond rapidly. The overcurrent control, which is common to all three phases, acts on the two other impedance controllers (not shown) via the connection 21 and 22.

A further limiting device 24 and 25 limits the desired impedance value z*. The limiter 25 prevents the setting of desired values smaller than the short-circuit impedance $z_k$. This prevents the electrode control from repeatedly running the installation into a short circuit. In order to prevent the impedance control and the overcurrent control from bucking each other in the event of an overcurrent, the desired impedance value is raised by the limiting device 24 to a limit value $z_G$ which is determined in an amplifier 23 from the ratio of the electrode voltage $U_1$ to the permissible electrode current $I_{max}$.

The arrangement for controlling electrodes as described here can be used directly as a resistance control if the electrode voltage is replaced by the true arc voltage, which is not accessible by direct measurement but can be determined indirectly.

What is claimed is:

1. In an arrangement for controlling arc furnace electrode means comprising at least one melting electrode fed from an output winding of a transformer, and including an impedance controller for each electrode, associated positioning means to adjust the height of each electrode, measuring means to furnish a first measured quantity proportional to the electrode voltage between the output winding of the transformer and the furnace jacket and a second measured quantity proportional to the electrode current, the invention comprising:

a divider connected to the measuring means to produce an actual impedance value proportional to the ratio of the first measured quantity to the second measured quality;

means to form a control deviation as the difference between a preset desired impedance value and the actual impedance value;

a lowpass filter connected to the output of the divider;

a first switching element connected in parallel to the filter, the output of the filter being connected to drive the impedance controller to the full in the event of a short circuit; and a second switching element connected to the output of the impedance controller to cut off signals therefrom at the instant the sum of the first and second measured quantities becomes zero.

2. The invention according to claim 1, in which the lowpass filter is a first-order filter with a long time constant.

3. The invention according to claim 2 comprising, in addition, limiting means to limit the desired impedance value, the limiting means being controlled to follow in accordance with the ratio of the electrode voltage to the permissible electrode current.

4. The invention according to claim 3, comprising, in addition:

a first output limiter connected to the ourput of the impedance controller;

an overcurrent controller; and a second output limiter connected to the output of the overcurrent controller, the second output limiter being settable to the minimum value of the positioning signal, the lower limit of the first output limiter being addressed in depandence on the output signal of an overcurrent controller and by the upper limit to which the maximum value for the positioning signal can be set.

5. The invention according to claim 4 for a 3-phase arc furnace in which the difference between the permissible value of the electrode current and the actual current value of the highest current value occurring in one of the phases is fed to the overcurrent controller.

6. The invention according to claim 1, 2, 3, 4, or 5 in which the transformer is variable in steps and the gain of the impedance controller has a range of values corresponding to the voltage steps of the transformer.

* * * * *